Feb. 23, 1932.  A. F. CLARKE  1,846,248

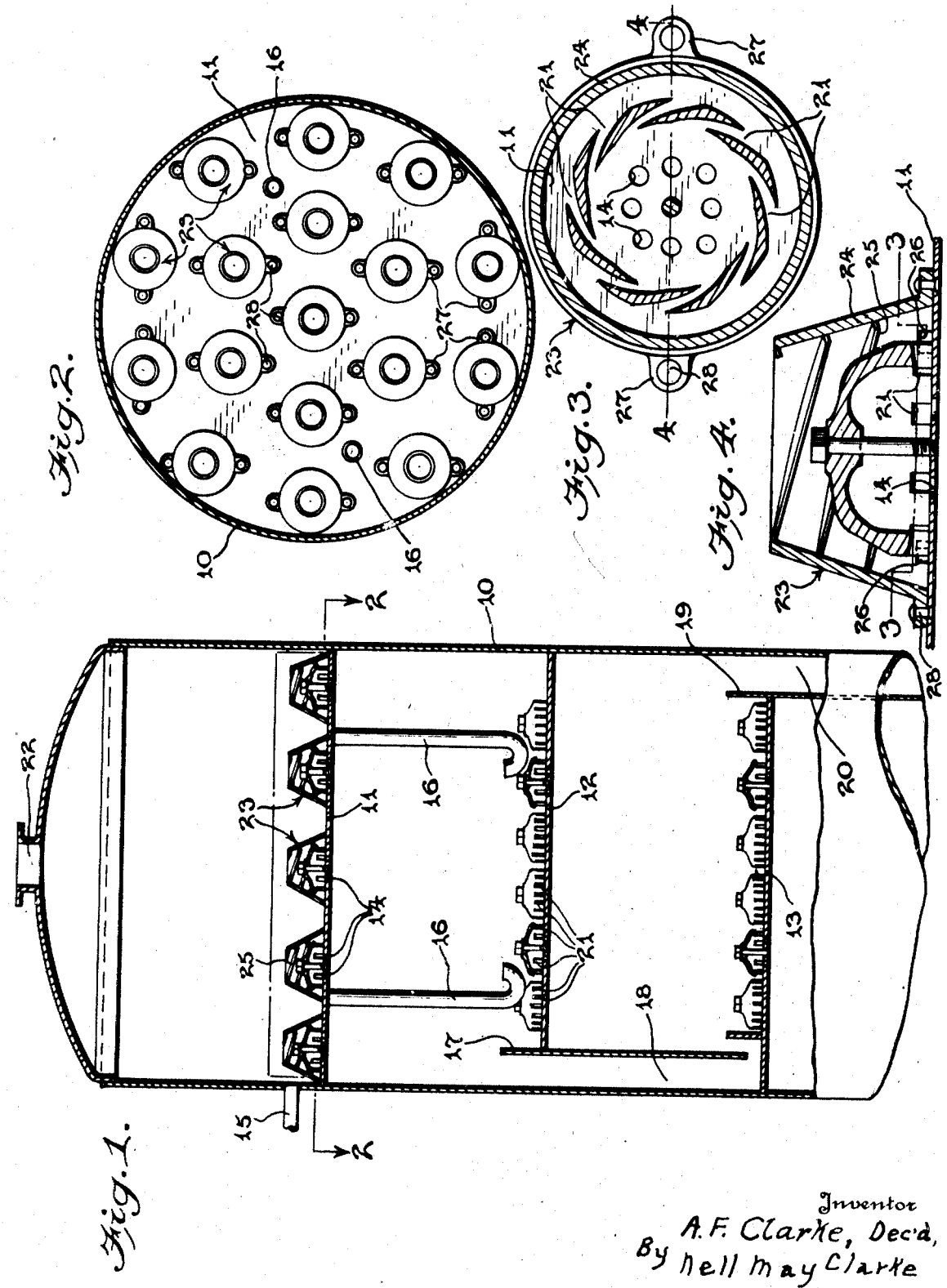

MIST EXTRACTOR

Filed June 25, 1929  2 Sheets-Sheet 2

Inventor
A. F. Clarke, Dec'd,
By Nell May Clarke
Execx,
By Robt. E. Barry
Attorney Patented Feb. 23, 1932

1,846,248

UNITED STATES PATENT OFFICE

ARTHUR F. CLARKE, DECEASED, LATE OF TULSA, OKLAHOMA, BY NELL MAY CLARKE, EXECUTRIX, OF TULSA, OKLAHOMA

MIST EXTRACTOR

Application filed June 25, 1929. Serial No. 373,636.

This invention relates to improvements in apparatus of the type used for contacting liquids and gases or for separating mixtures of liquids and gases.

These improvements may be employed with absorption towers, rectifying columns, oil and gas separators, or the like. In such apparatus, the gas in the tower rises and the liquid descends, and the primary object of the invention is to provide a mist extractor for positively separating entrained liquid from the gas, just before the gas is discharged from the top of the tower. The improved mist extractor removes from the gas or vapor whatever liquid may be carried into the mist extractor zone by the gas.

Another object is to furnish a mist extractor especially adapted for use with a bubble cap, nozzle, nipple or other suitable appliance or port in a deck arranged in the column, such extractor having a spiral baffle on which the entrained liquid collects as the gas whirls through the mist extractor.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a vertical sectional view of the upper portion of a rectifying column or absorption tower, and showing the improved mist extractors applied over bubble caps on the top deck of the column.

Fig. 2 is a horizontal sectional view on the line 2—2 of Fig. 1.

Fig. 3 is an enlarged sectional view of one of the mist extractors and bubble caps.

Fig. 4 is a vertical sectional view of the same on the line 4—4 of Fig. 3, and showing a bubble cap in full lines, arranged therein.

Figure 5:
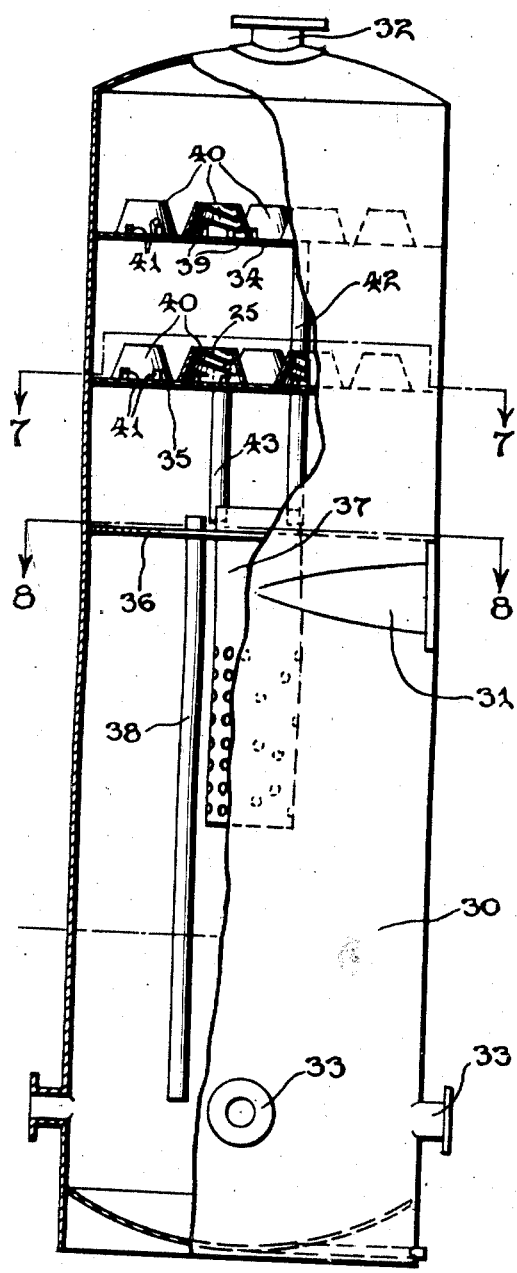
Fig. 5 is a side elevation partly in vertical section of an oil and gas separator provided with the improved mist extractors.

In the embodiment of the invention illustrated in Figs. 1 to 4 inclusive, 10 indicates the shell of an absorption tower or rectifying column, which is provided with superposed decks 11, 12, 13 having suitable apertures 14 through which gas introduced into the column, rises. The liquid introduced into the column through a pipe 15, flows over the upper deck, and then descends through trap pipes 16 to the second deck 12. The liquid flows over this deck and is discharged over a weir 17, into a passageway 18, which conveys the liquid to the third deck 13. Liquid flowing over this deck will pass over a weir 19, into a passageway 20, which conducts it to the next lower deck and so on. The bubble caps which it is preferred to employ, are of the type shown in patent application Serial No. 285,572, filed June 15, 1928, and the gas after passing through tangential slits 21, in these caps, whirls through the liquid on the decks, and is finally discharged through the gas or vapor outlet 22 at the top of the column.

In absorption towers, rectifying columns or the like, the rising gas or vapor may carry some entrained liquid, and as it is desirable to separate such liquid from the gases or vapors leaving the column, each bubble cap on the top deck is provided with a mist extractor 23. Such extractor is best shown in Figs. 3 and 4, and preferably consists of a frusto-conical tube 24 having a spiral thread or baffle 25 arranged on its inner surface. As the gas or vapors are discharged by the bubble cap into the tube 24, the spiral baffle acts to whirl the gas and cause the deposit of entrained liquid on the inner surface of the tube and on the baffle, due to centrifugal action. The liquid thus collected, gravitates down the interior of the tube and is finally deposited in the liquid pool on the deck. To permit this, the tube is provided with notches 26 at its lower edge, to allow free passage of liquid along the deck, to and from the interior of the tube. Each tube is preferably provided with a pair of apertured ears 27, to receive any suitable fastening devices, such as rivets 28, that may be employed to secure the mist extractor to the deck. It may be seen from Figs. 3 and 4 that the tangential ports 21 of the bubble caps on the top deck function to whirl the rising gas through the liquid on that deck, and as the spiral baffles 25 are arranged to coincide with the direction of movement of the gas, this whirling action of the gas will be continued until the gas is discharged from the upper end of the extractors.

Figure 6:
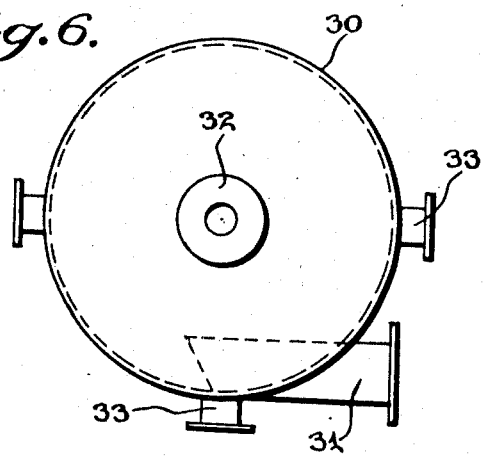
Fig. 6 is a top plan view of the same.
Figure 7:
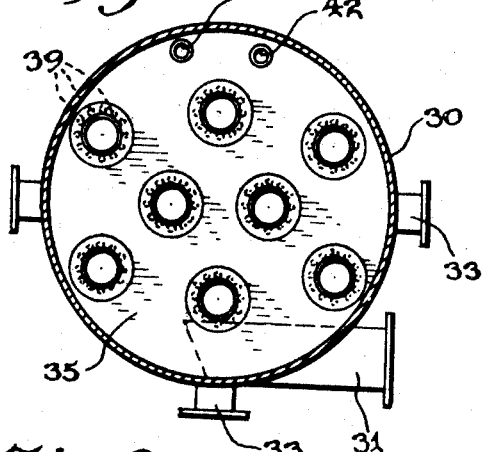
Fig. 7 is a horizontal sectional view on the line 7—7 of Fig. 5.
Figure 8:
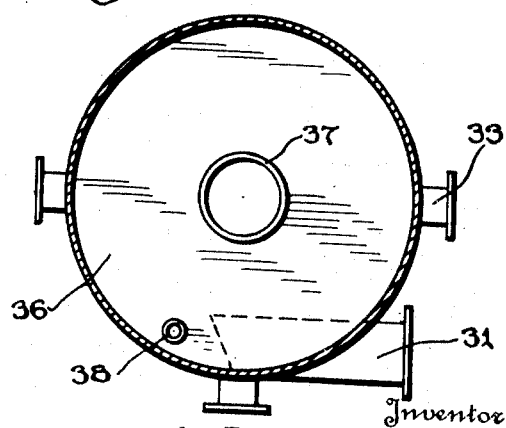
Fig. 8 is a sectional view on the line 8—8 of Fig. 5.

Figs. 5 to 8 inclusive, show an improved type of oil and gas separator, provided with these mist extractors. In this embodiment of the invention, the shell of the separator is designated 30. The mixture of oil and gas is introduced tangentially into the cylindrical shell by means of the pipe 31, and the gas is discharged at 32, and the liquid exits through the pipes 33. Arranged within the shell are horizontal decks 34, 35 and 36 which are secured in position by any suitable means. A perforated pipe 37 extends downwardly through the lower deck, and it functions to convey gas and entrained liquids from the zone below the lower deck to the zone above the lower deck. Any condensate or liquid deposited on the lower deck will overflow downwardly through the pipe 38 into the lower end of the shell. This pipe is suspended from the deck 36 by any suitable means. At this point it will be noted that the deck 36 is imperforate with the exception of the two apertures with which it is provided to accommodate the pipes 37 and 38. The decks 34 and 35 are substantially alike, and each has a number of circularly arranged series of apertures 39 to accommodate the rising gas and vapors so that such gas and vapors may move from one zone to the next higher zone, and so on; and each series of these apertures is combined with one of the improved mist extractors 40 of the type shown in Figs. 3 and 4, so that the gas and vapor rising through the decks will be whirled by the spirals of the mist extractors to cause precipitation of the entrained liquids which will be discharged through the notches 41 on to the deck. Liquid deposited on the upper deck, flows downwardly through a pipe 42 on to the lower deck, and liquid deposited on the intermediate deck, flows downwardly on to the lower deck through a pipe 43.

In the operation of this embodiment of the invention, the mixture of oil and gas enters the shell through the inlet 31, and due to the tangential arrangement of this inlet, and the circular internal surface of the shell, the mixture will be whirled so that the major portion of the liquid will be deposited on the inner surface of the shell, due to centrifugal force. Of course, this liquid will gravitate to the bottom portion of the shell. After this initial or rough separation, the gas with entrained liquid rises through the perforated pipe 37, and owing to the perforations being small, an additional amount of the liquid will be separated from the gas, and this liquid will also flow down into the lower end of the shell. The gas and entrained liquid discharging from the upper end of the pipe 37, now rise through the series of ports 39 in the deck 35, and are whirled by the baffles in the mist extractors 40, so that there is a further separation of oil from the gas. The oil thus separated, flows through the notches 41, on to the deck 35, and finally overflows through the pipe 43. The gas, from which practically all of the liquid has now been separated, then rises through the apertures 39 of the top deck, where the separating action is continued, and the liquid deposited on this deck overflows through the pipe 42. The gas finally freed of entrained liquid, is discharged through the pipe 32.

In the foregoing description, preferred embodiments of the invention have been set forth, but it is manifest that changes may be made in the details disclosed, without departing from the spirit of the invention, as expressed in the claims.

What is claimed and desired to be secured by Letters Patent is:

1. A mist extractor, comprising a hollow tubular frusto-conical member having its smaller end uppermost, and provided at its larger end with means to permit the securing of the same to an apparatus with which the extractor is to be used, a spiral baffle rigidly mounted with the inner surface of the tubular member and extending from one end of the tubular member to the other, the lower end portion of the wall of tubular member being provided with apertures to permit liquid to flow through the wall thereof.

2. A mist extractor for use in separating entrained liquids from flowing gases, comprising a vertically disposed hollow member provided on its inner surface with means rigidly united therewith for causing gases travelling upwardly therethrough to whirl and by centrifugal action, precipitate entrained liquids from the gases, means for introducing the gases carrying entrained liquid into the lower end of said member, and means for discharging the precipitated liquid from the lower end of said member.

3. A mist extractor for use in separating entrained liquids from flowing gases, comprising a vertically disposed hollow member provided on its inner surface with means rigidly united therewith for causing gases travelling upwardly therethrough to whirl and by centrifugal action, precipitate entrained liquids from the gases, means for introducing the gases carrying entrained liquid into the lower end of said member, and means for discharging the precipitated liquid from the lower end of said member, said tubular member being of frustro-conical shape with its reduced end uppermost.

4. A mist extractor for use in separating entrained liquid from flowing gases, comprising a vertically disposed hollow tubular member provided on its inner surface with means rigidly united therewith for causing gases travelling upwardly therethrough to whirl and by centrifugal action, precipitate entrained liquids from said gases, means for introducing said gases tangentially into the lower end of the tubular member, and means for discharging precipitated liquid from the lower end of said tubular member.

5. A mist extractor for separating entrained liquid from flowing gases, comprising a vertically disposed hollow tubular member provided on its inner surface with a spiral baffle rigidly united therewith for causing gases travelling upwardly therethrough to whirl and by centrifugal action, precipitate entrained liquid from said gases, said member being of frusto-conical shape, with its smaller end uppermost, and means for discharging said gases into the lower end of the member and for directing the same against the inner surface of said member.

6. A mist extractor for use in separating entrained liquid from flowing gases, comprising a hollow tubular member provided on its inner surface with means rigidly united therewith for causing gases travelling upwardly therethrough to whirl and by centrifugal action, precipitate entrained liquid from the gases, means at the lower end of the tubular member for discharging the precipitated liquid through the wall of the tubular member, and means for introducing said gases into the lower end of said tubular member.

7. A mist extractor of the character described, including a vertically disposed hollow tubular frusto-conical member having on its inner surface, a spiral baffle, the lower end of said member forming an inlet for gases carrying entrained liquid, and the upper end of the member forming an outlet for gases from which the liquid has been separated, the lower end of the wall of said member having ports for discharging precipitated liquid from the interior of said member.

NELL MAY CLARKE,
*Executrix of Arthur F. Clarke, Deceased.*